(12) United States Patent
Kitamura

(10) Patent No.: US 10,114,191 B2
(45) Date of Patent: Oct. 30, 2018

(54) LENS UNIT, VEHICLE-MOUNTED CAMERA, AND IMAGING DEVICE

(71) Applicant: KYOCERA Corporation, Kyoto (JP)

(72) Inventor: Nobuo Kitamura, Tokyo (JP)

(73) Assignee: KYOCERA Corporation, Kyoto (JP)

( * ) Notice: Subject to any disclaimer, the term of this patent is extended or adjusted under 35 U.S.C. 154(b) by 50 days.

(21) Appl. No.: 15/328,465

(22) PCT Filed: Jul. 29, 2015

(86) PCT No.: PCT/JP2015/003828
§ 371 (c)(1),
(2) Date: Jan. 23, 2017

(87) PCT Pub. No.: WO2016/017173
PCT Pub. Date: Feb. 4, 2016

(65) Prior Publication Data
US 2017/0212322 A1  Jul. 27, 2017

(30) Foreign Application Priority Data

Jul. 29, 2014 (JP) ................................. 2014-154284

(51) Int. Cl.
*G02B 7/02* (2006.01)
*B60R 11/04* (2006.01)
*B60R 1/00* (2006.01)

(52) U.S. Cl.
CPC ................ *G02B 7/02* (2013.01); *B60R 1/00* (2013.01); *B60R 11/04* (2013.01); *B60R 2300/20* (2013.01)

(58) Field of Classification Search
CPC .. G02B 7/02; B60R 1/00; B60R 11/04; B60R 2300/20

USPC ......................................................... 359/819
See application file for complete search history.

(56) References Cited

U.S. PATENT DOCUMENTS

| | | | |
|---|---|---|---|
| 5,973,862 A | 10/1999 | Hashizume | |
| 8,573,868 B2 * | 11/2013 | Hasuda | G03B 17/565 359/828 |
| 2014/0313337 A1 * | 10/2014 | Devota | B60R 11/04 348/148 |

FOREIGN PATENT DOCUMENTS

| | | |
|---|---|---|
| JP | H10-282389 A | 10/1998 |
| JP | H11-017199 A | 1/1999 |
| JP | 2007-010901 A | 1/2007 |

(Continued)

OTHER PUBLICATIONS

International Search Report issued in PCT/JP2015/003828; dated Oct. 27, 2015.

(Continued)

*Primary Examiner* — William R Alexander
*Assistant Examiner* — Grant Gagnon
(74) *Attorney, Agent, or Firm* — Studebaker & Brackett PC

(57) ABSTRACT

Provided is a lens unit, which includes a lens barrel and a lens. The lens barrel includes a wall portion, which extends in the first direction. The wall portion includes at least two first inclined portions and at least two second inclined portions. A distance from each first inclined portion to a central axis CX is decreased as the first inclined portion extends to the first direction. A distance from each second inclined portion to the central axis CX is increased as the second inclined portion extends to the first direction. The lens is held in the wall portion by the first inclined portions and the second inclined portions.

9 Claims, 11 Drawing Sheets

(56) References Cited

FOREIGN PATENT DOCUMENTS

| JP | 2007-188034 A | 7/2007 |
|---|---|---|
| JP | 2008-191412 A | 8/2008 |

OTHER PUBLICATIONS

Written Opinion issued in PCT/JP2015/003828; dated Oct. 27, 2015; with English language Concise Explanation.

* cited by examiner

First direction

First direction 23   22

US 10,114,191 B2

LENS UNIT, VEHICLE-MOUNTED CAMERA, AND IMAGING DEVICE

CROSS-REFERENCE TO RELATED APPLICATION

The present application claims priority to and the benefit of Japanese Patent Application No. 2014-154284 (filed on Jul. 29, 2014), the entire contents of which are incorporated herein by reference.

TECHNICAL FIELD

The present disclosure relates to a lens unit, a vehicle-mounted camera (hereinafter, called an onboard camera), and an imaging device all of which reduce inclination of an optical axis of a lens from a appointed direction.

BACKGROUND

There is proposed a lens device in which a lens is held in a lens barrel made of resin (refer to Patent Literature 1).

CITATION LIST

Patent Literature

PTL 1: JP2007010901A

SUMMARY

According to the first aspect, disclosed is a lens unit, including: a lens barrel including a wall portion that is disposed on at least a part of a circumference on a plane perpendicular to a first direction and that extends in the first direction, the wall portion including at least two first inclined portions and at least two second inclined portions, a distance from each first inclined portion to a central axis, which passes through a center of the circumference and which is parallel with the first direction, being decreased as the first inclined portion extends to the first direction, and a distance from each second inclined portion to the central axis being increased as the second inclined portion extends to the first direction; and a lens held in the wall portion by the first inclined portions and the second inclined portions.

According to the second aspect, disclosed is an onboard camera, including: a lens barrel including a wall portion that is disposed on at least a part of a circumference on a plane perpendicular to a first direction and that extends in the first direction, the wall portion including at least two first inclined portions and at least two second inclined portions, a distance from each first inclined portion to a central axis, which passes through a center of the circumference and which is parallel with the first direction, being decreased as the first inclined portion extends to the first direction, and a distance from each second inclined portion to the central axis being increased as the second inclined portion extends to the first direction; a lens held in the wall portion by the first inclined portions and the second inclined portions; and an imaging sensor that captures an image of a subject that is formed by the lens.

According to the third aspect, disclosed is an imaging device, including: a lens barrel including a wall portion that is disposed on at least a part of a circumference on a plane perpendicular to a first direction and that extends in the first direction, the wall portion including at least two first inclined portions and at least two second inclined portions, a distance from each first inclined portion to a central axis, which passes through a center of the circumference and which is parallel with the first direction, being decreased as the first inclined portion extends to the first direction, and a distance from each second inclined portion to the central axis being increased as the second inclined portion extends to the first direction; a lens held in the wall portion by the first inclined portions and the second inclined portions; and an imaging sensor that captures an image of a subject that is formed by the lens.

DETAILED DESCRIPTION

However, the lens device described in Patent Literature 1 is configured to hold the lens by sandwiching the lens between a receiving portion, which includes an opening, and a holding protrusion. Accordingly, it is difficult to align an optical axis of the lens, which is held solely by the lens barrel, in a desired position and direction. The lens device described in Patent Literature 1 therefore poses the need for the complicated process of attaching the lens to the lens barrel in the state where the lens is fixed by a jig.

The present disclosure is to provide a lens barrel, a lens unit, and an imaging device each of which singly prevents inclination of an optical axis of a lens to be held from a desired direction.

A lens unit, an onboard camera, and an imaging device configured as above each singly prevent inclination of the optical axis of the lens to be held from a desired direction.

Hereinafter, an embodiment of the present disclosure will be described with reference to the drawings.

Figure 1:
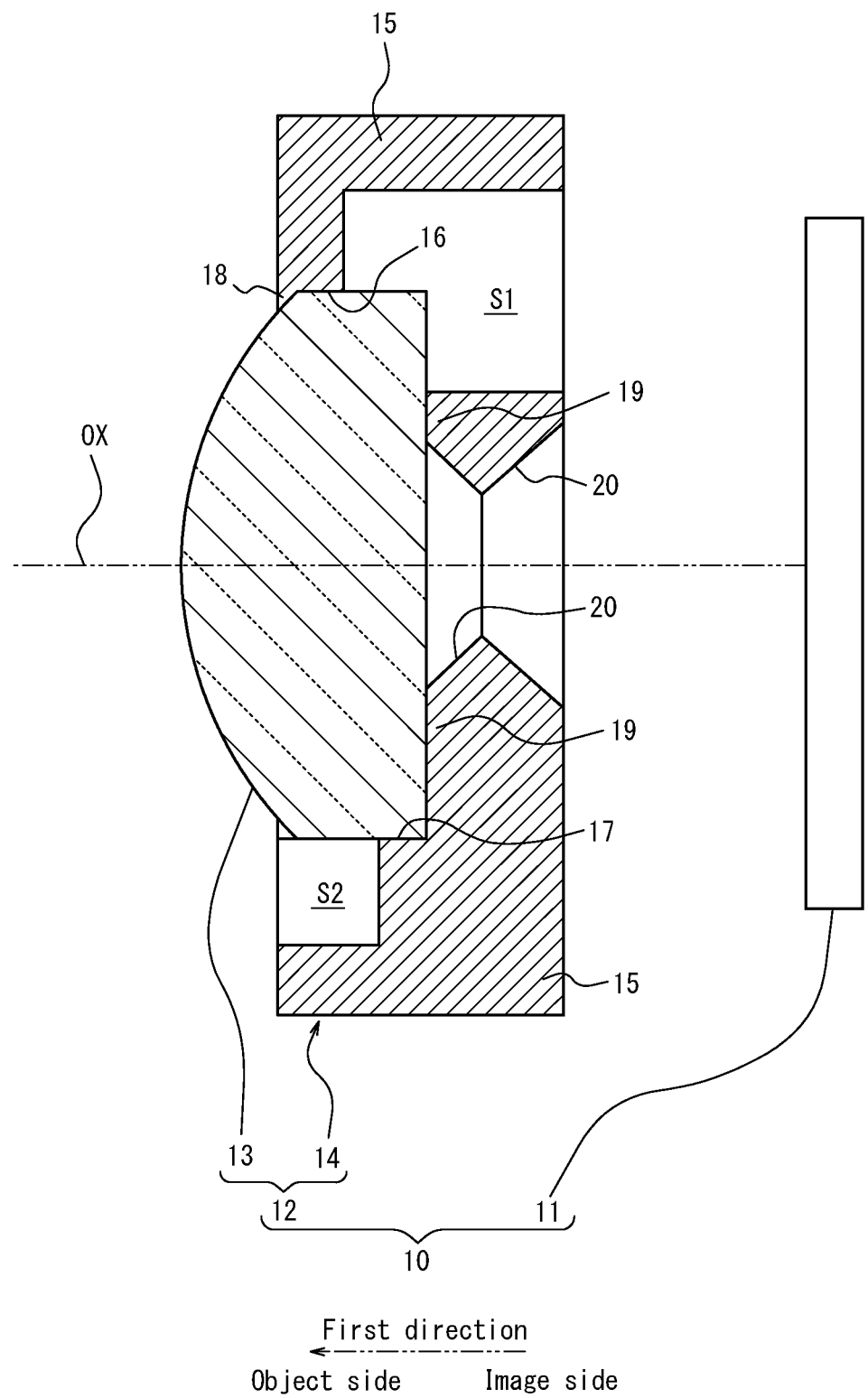
FIG. 1 is a sectional view passing through an optical axis of a lens unit, the figure illustrating a schematic configuration of an imaging device including the lens unit containing a lens barrel according to one of embodiments of the present disclosure.

As illustrated in FIG. 1, an imaging device 10 includes an imaging sensor 11 and a lens unit 12.

The imaging sensor 11 is disposed in an image forming position of a lens 13 included in the lens unit 12 to capture an image of a subject that is formed by the lens 13.

The lens unit 12 includes the lens 13 and a lens barrel 14. Although in the present embodiment the lens unit 12 includes the single lens 13, the lens unit 12 may also include a plurality of lenses. The lens 13 is held in the lens barrel 14 in a manner such that an optical axis OX aligns with the central axis of the lens barrel 14 that is described later, and as described above, the lens 13 forms an image of a subject.

In the lens barrel 14, a direction that is parallel with the optical axis OX of the lens 13 that the lens barrel 14 holds is defined as the first direction. The first direction may be a direction from an object side to an image side or a direction from an image side to an object side. In the present embodiment, the first direction as used in the following description is defined as a direction from an image side to an object side.

Figure 2:
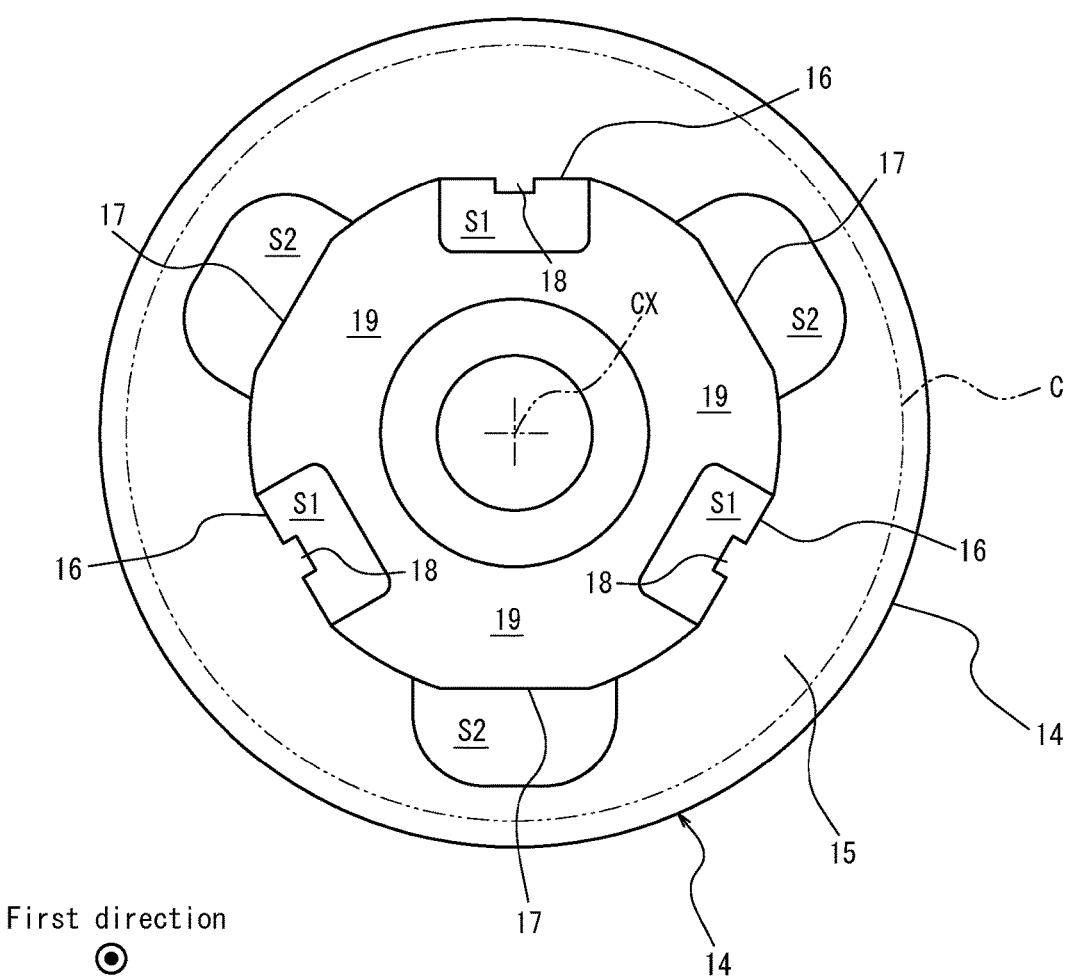
FIG. 2 is a front view of a lens barrel illustrated in FIG. 1.

The lens barrel 14 is formed by molding, for example, resin with use of a mold. The lens barrel 14 includes a wall portion 15, which extends in the first direction. As illustrated in FIG. 2, the wall portion 15 is disposed on at least a part of a circumference C on a plane perpendicular to the first direction. For instance, in the present embodiment, the wall portion 15 has a cylindrical shape and is disposed over the entire area of the circumference C.

The wall portion 15 includes at least two, such as three, first inclined portions 16 and at least two, such as three, second inclined portions 17. The wall portion 15 further includes a protruding portion 18 on each first inclined portion 16.

The first inclined portions 16 and the second inclined portions 17 are alternately disposed along the circumferential direction of the circumference C. The first inclined portions 16 and the second inclined portions 17 are also disposed at an equal interval along the circumferential direction of the circumference C.

Figure 3:
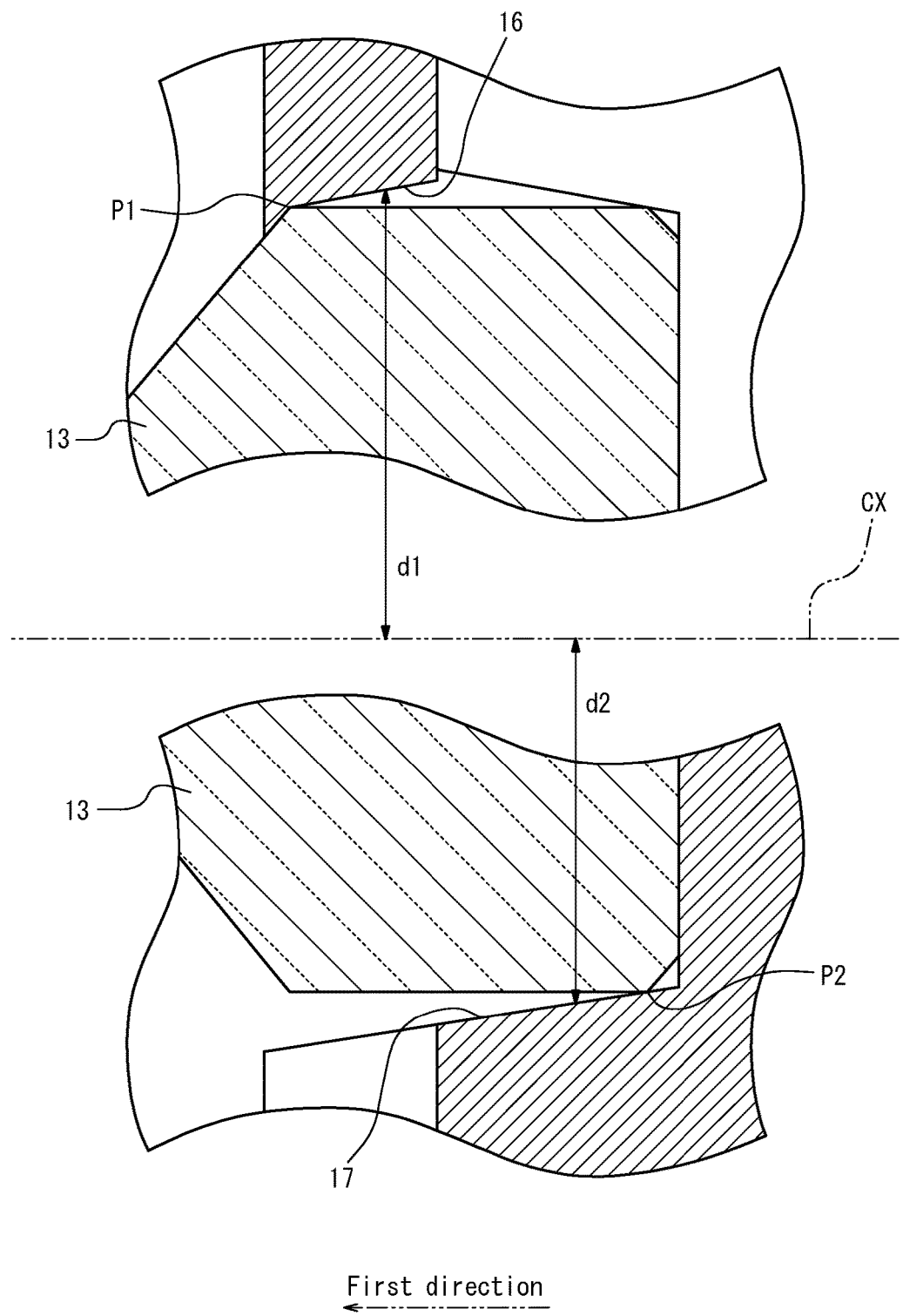
FIG. 3 is a partial sectional view enlarging the vicinity of the first inclined portions and the second inclined portions illustrated in FIG. 1.

As illustrated in FIG. 3, a distance d1 from each first inclination portion 16 to the central axis CX, which passes through the center of the circumference C and which is parallel with the first direction, is decreased as the first inclined portion 16 extends to the first direction. A distance d2 from each second inclined portion 17 to the central axis CX is increased as the second inclined portion 17 extends to the first direction. In FIG. 3, inclination of the first inclined portions 16 and the second inclined portions 17 with respect to the central axis CX is illustrated in an emphasized manner. However, inclination is slight, and as illustrated in FIG. 1, inclination may be even regarded as substantially parallel with the central axis CX aligned with the optical axis OX.

Each first inclined portions 16 and each second inclined portions 17 are formed in a manner such that a position in the first direction of the first inclined portion 16 in which the distance d1 to the central axis CX is smallest differs from a position in the first direction of the second inclined portion 17 in which the distance d2 to the central axis CX is smallest. For instance, in the present embodiment, the entire first inclined portion 16 is formed on the side further in the first direction than the entire second inclined portion 17. Moreover, a position (refer to P1) in the first direction of the first inclined portion 16 in which the distance d1 to the central axis CX substantially equals a radius of the lens 13 to be held differs from a position (refer to P2) in the first direction of the second inclined portion 17 in which the distance d2 to the central axis CX equals the radius of the lens 13 to be held.

Figure 4:
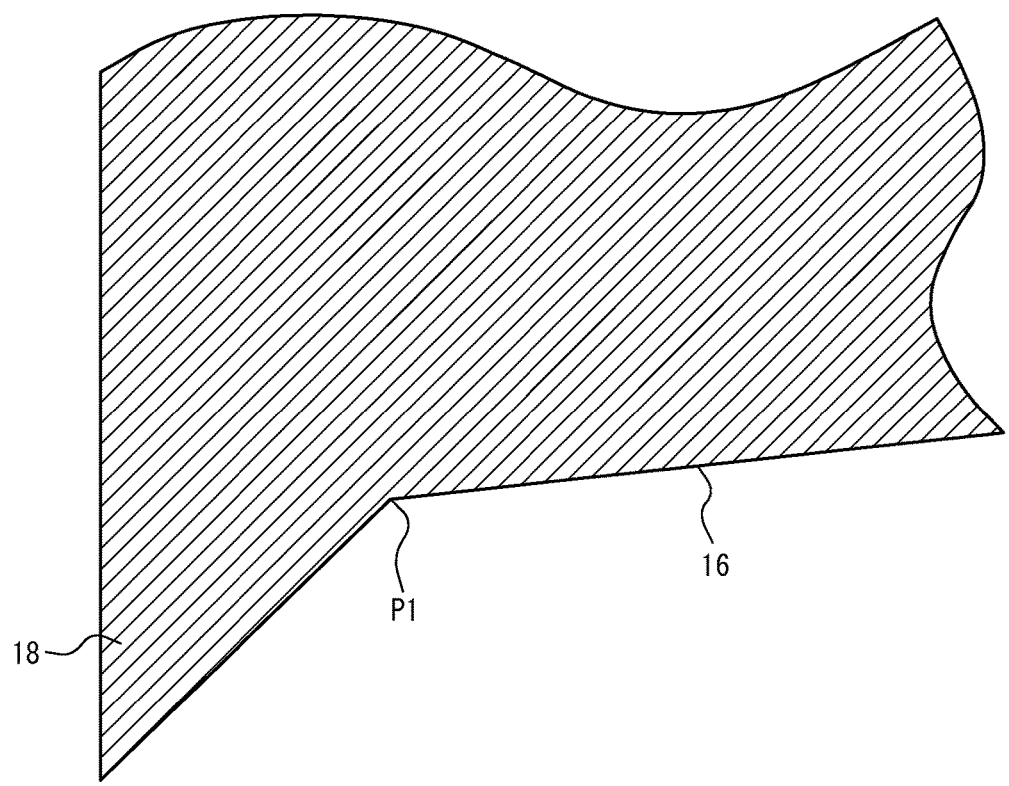
FIG. 4 is a partial sectional view enlarging the vicinity of a protrusion illustrated in FIG. 3.

As illustrated in FIG. 4, the protruding portion 18 is located further in the first direction than the position (refer to P1) that is further in the first direction than any other positions within the first inclined portion 16, and the protruding portion 18 protrudes toward the central axis CX (refer to FIG. 2).

The lens barrel 14 includes an annular seat 19 on the inner side of the wall portion 15 (refer to FIGS. 1 and 2). The seat 19 regulates displacement of the lens 13 in a direction opposite to the first direction. The seat 19 defines a pore 20, which has a truncated conical shape about the central axis CX. The pore 20 allows light beam of a subject passing through the lens 13 to reach the imaging sensor 11.

Figure 5:
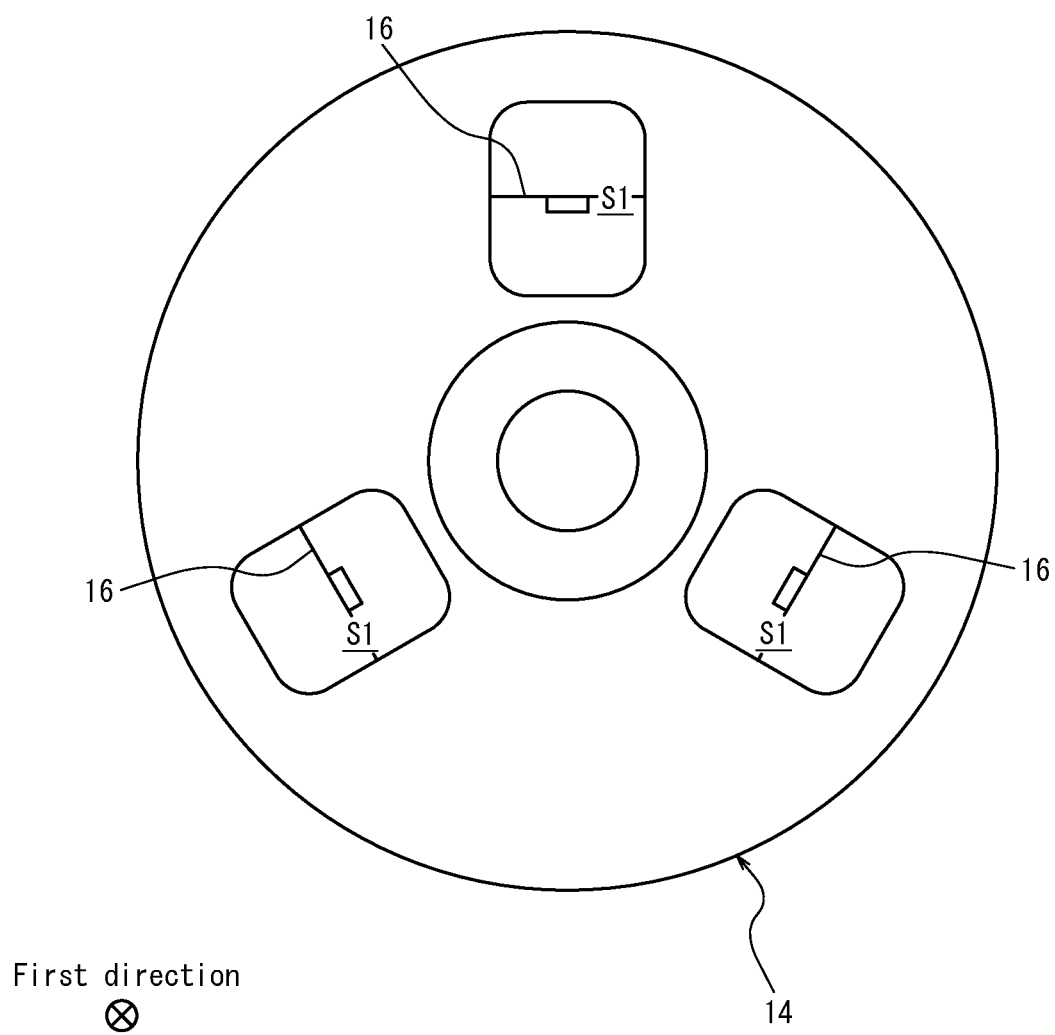
FIG. 5 is a back view of a lens barrel illustrated in FIG. 1.

The lens barrel 14, including the seat 19, is formed in a manner such that sections S1 (refer to FIGS. 1, 2, and 5) that overlap with the first inclined portions 16 and that extend to the first inclined portions 16 as viewed in the direction opposite to the first direction are hollow. The lens barrel 14 is also formed in a manner such that sections S2 (refer to FIG. 1) that overlap with the second inclined portions 17 and that extend to the second inclined portions 17 as viewed in the first direction are hollow.

Since including the first inclined portions 16 and the second inclined portions 17, the lens barrel in the present embodiment configured as above prevents inclination of the optical axis OX of the lens 13 to be held from the first direction, that is to say, a desired direction, by the lens barrel 14 alone as described below.

Figure 6:
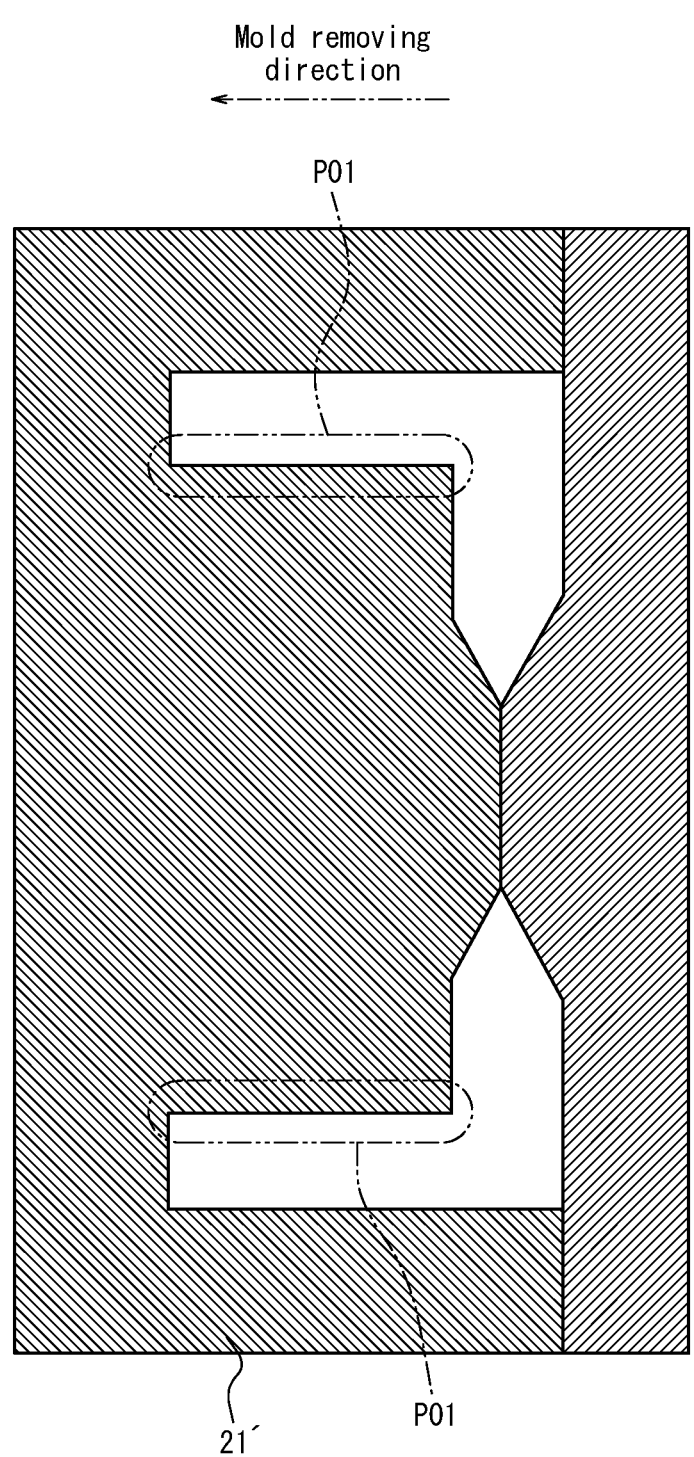
FIG. 6 is a sectional view of a mold used for molding a lens barrel, a part of the mold that faces an inner diameter of the lens barrel having a uniform outer diameter.
Figure 7:
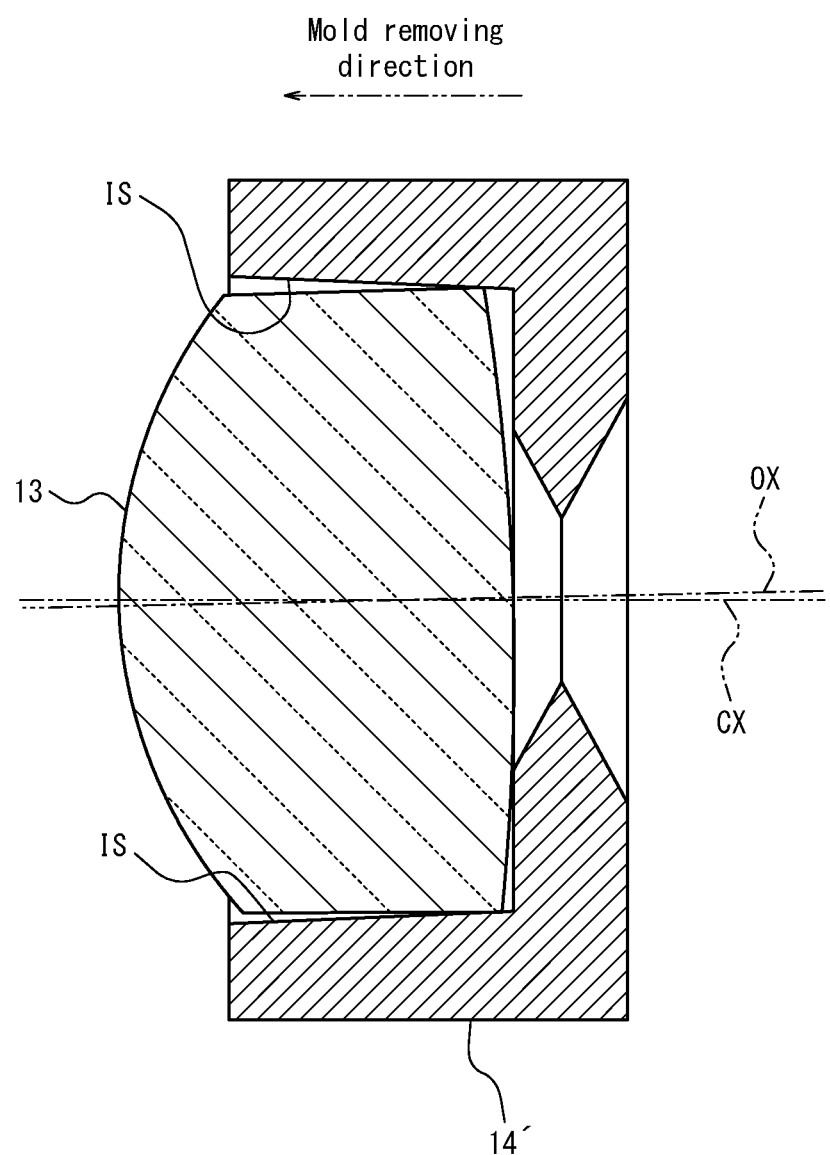
FIG. 7 is a sectional view passing through an optical axis, the figure illustrating inclination of the optical axis that may occur when a lens is accommodated in a lens barrel molded with use of a mold illustrated in FIG. 6.

It is possible to align an optical axis of a lens with high precision by using a lens barrel alone when the used lens barrel has a very accurately uniform inner diameter with the same length as a very accurately uniform outer diameter of a common glass lens. However, in molding with use of a mold, which is a common method of forming a lens barrel, even when a mold 21', a part (refer to reference numeral "PO1") of which that faces the inner diameter of a lens barrel has a uniform outer diameter as illustrated in FIG. 6, is used, an inner circumferential surface IS of a molded lens barrel 14' that is parallel with a direction in which the mold 21' is removed is slightly inclined to be widened as the inner circumferential surface IS extends to the removing direction as illustrated in FIG. 7. Accommodating the lens 13, which has a very accurately uniform outer diameter, in the lens barrel 14' often results in inclination of the optical axis OX of the lens 13 from the 13 central axis CX of the lens barrel 14'.

On the other hand, according to the lens barrel 14 in the present embodiment, the first inclined portion 16 and the second inclined portion 17 may contact an outer circumference of the lens 13 at different positions in the first direction. Accordingly, the lens barrel 14 singly prevents inclination of the optical axis OX of the lens 13 from the first direction.

Furthermore, according to the lens barrel in the present embodiment, the position in the first direction of the first inclined portion 16 in which the distance d1 to the central axis CX is smallest differs from the position in the first direction of the second inclined portion 17 in which the distance d2 to the central axis CX is smallest. This ensures that the position of contact in the first direction between the first inclined portion 16 and the outer circumference of the lens 13 differs from the position of contact in the first direction between the second inclined portion 17 and the outer circumference of the lens 13.

Moreover, according to the lens barrel in the present embodiment, the first inclined portions 16 and the second inclined portions 17 are alternately disposed along the circumferential direction about the central axis CX. This prevents misalignment of the optical axis OX of the lens 13 from the central axis CX.

Moreover, according to the lens barrel in the present embodiment, the first inclined portions 16 and the second inclined portions 17 are disposed at an equal interval along the circumferential direction. This further prevents inclination and misalignment of the optical axis OX of the lens 13 to be held from the first direction and the central axis CX.

Moreover, according to the lens barrel in the present embodiment, the protruding portion 18 is included. Thus, the protruding portion 18 and the seat 19 sandwich the lens 13 in the first direction. Accordingly, by press-fitting the lens 13 in the lens barrel 14 from the first direction while the protruding portion 18 is spread out, the lens 13 may be fixed in the lens barrel 14 without the need for a crimp process or the like. This omits the need for additional members, such as a retainer and an adhesive, and reduces manufacturing cost. Besides, a decrease in precision of fixing the lens 13 that would occur in use of an adhesive due to a decrease in adhesion is prevented.

Figure 8:
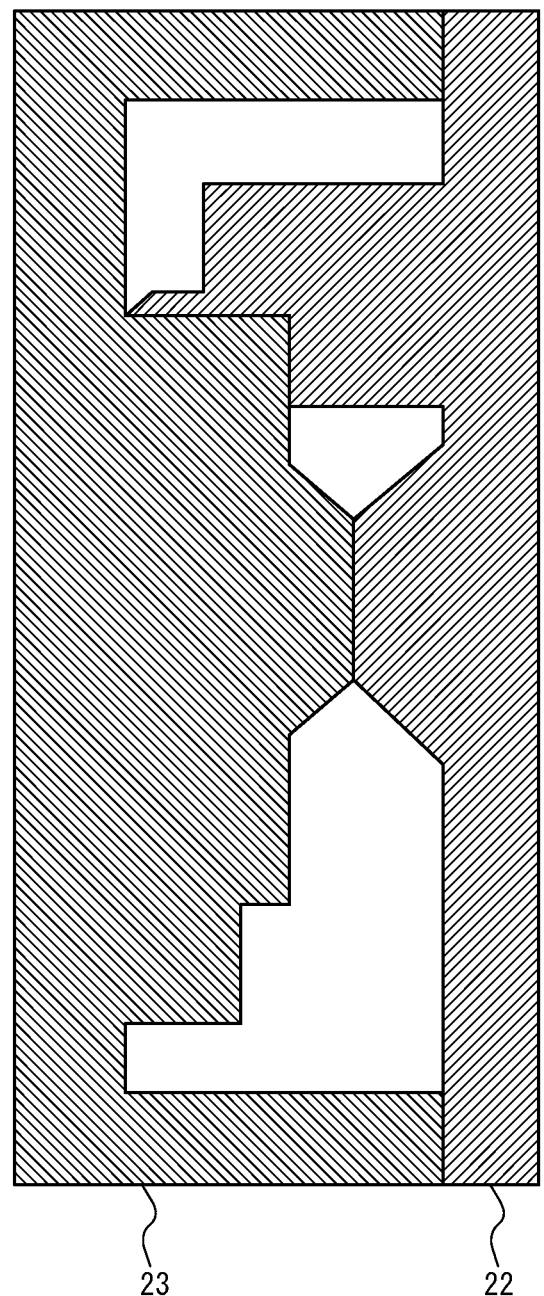
FIG. 8 is a sectional view of the first mold and the second mold which may be used to mold a lens barrel illustrated in FIG. 1.

Moreover, according to the lens barrel in the present embodiment, the sections S1 that overlap with the first inclined portions 16 as viewed in the direction opposite to the first direction are hollow. Accordingly, as illustrated in FIG. 8, the first inclined portions 16 may be formed easily by using the first mold 22, which is simply removed in the direction opposite to the first direction after molding. Besides, the sections S2 that overlap with the second inclined portions 17 as viewed in the first direction are hollow. Accordingly, the second inclined portions 17 may be formed easily by using the second mold 23, which is simply removed in the first direction after molding. Thus, the lens barrel 14 may be manufactured easily by molding with use of the first mold 22 and the second mold 23.

Although the present disclosure has been described based on the drawings and the embodiment, it is to be noted that a person skilled in the art may easily make various changes and modifications based on the present disclosure. Therefore, such changes and modifications are to be understood as included within the scope of the present disclosure.

Figure 9:
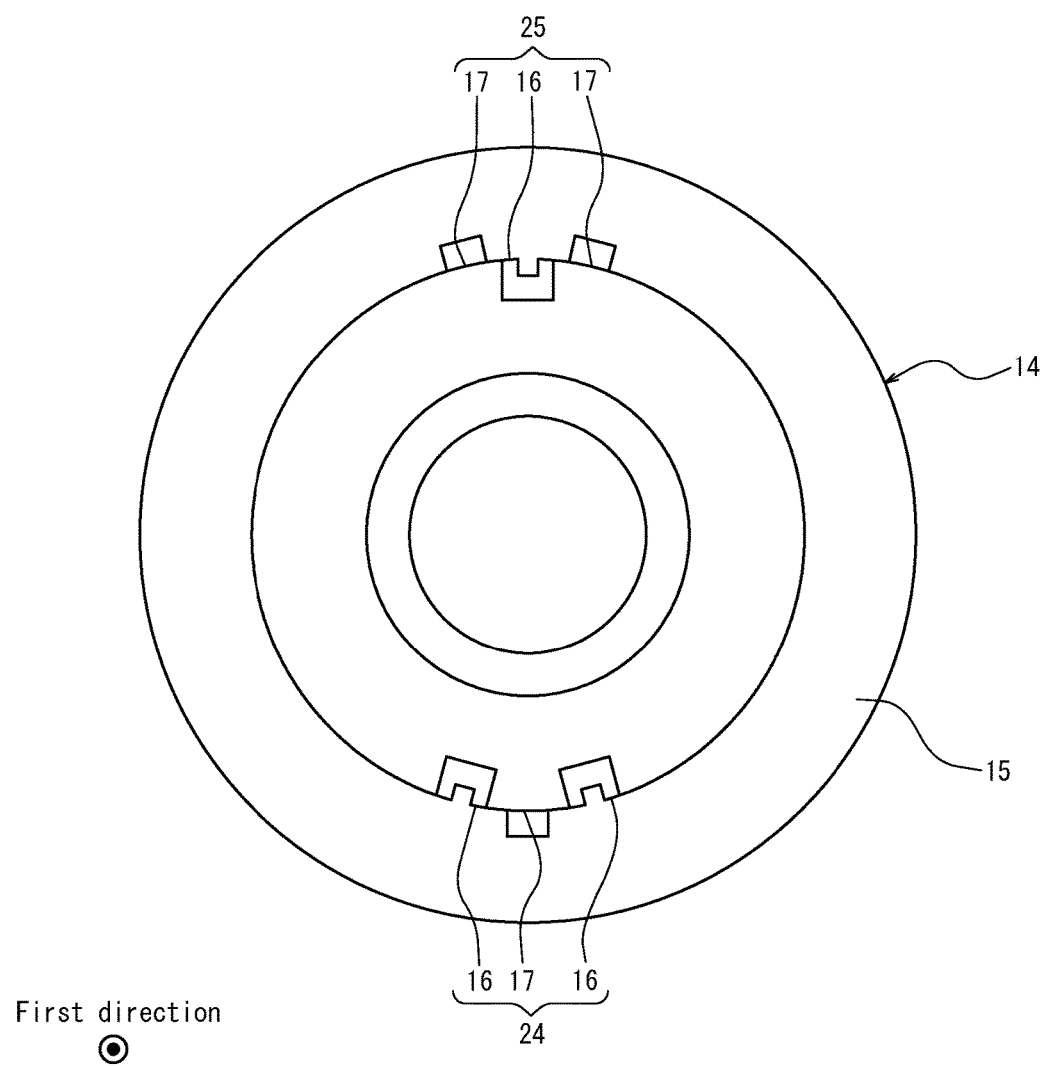
FIG. 9 is a front view of a lens barrel that illustrates a modification of a lens barrel illustrated in FIG. 2.

For instance, as illustrated in FIG. 9, in the wall portion 15, at least one first holding unit 24 and at least one second holding unit 25 may be disposed at an equal interval along the circumferential direction. Alternatively, in the wall portion 15, at least two first holding units 24 or at least two second holding units 25 may be disposed at an equal interval along the circumferential direction. Each first holding unit 24 includes at least two first inclined portions 16 and at least one second inclined portion 17 in the vicinity of each other in the circumferential direction. Each second holding unit 25 includes at least one first inclined portion 16 and at least two second inclined portions 17 in the vicinity of each other in the circumferential direction.

Disposing the first inclined portion(s) 26 and the second inclined portion(s) 27 in the vicinity of each other in the circumferential direction, as in the first holding unit 24 and the second holding unit 25, further prevents inclination of the optical axis OX of the lens 13 from the central axis CX.

Figure 10:
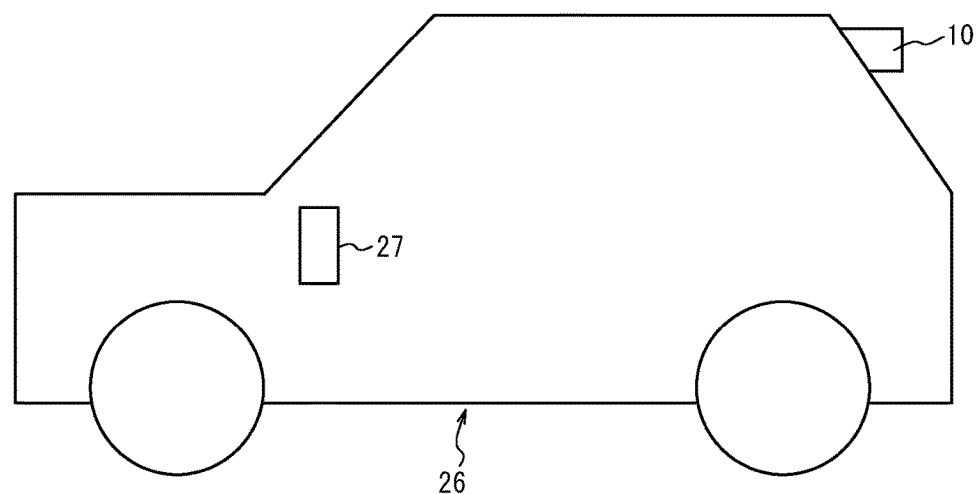
FIG. 10 illustrates a vehicle in which an imaging device illustrated in FIG. 1 is mounted.

Furthermore, as illustrated in FIG. 10, the imaging device 10 may also be used as an onboard camera mounted in a vehicle 26. The imaging device 10 is mounted in the vehicle 26, for example, in a manner such that the imaging device 10 may capture an image of surroundings at the rear of the vehicle 26. However, a position of the vehicle 26 in which the imaging device 10 is mounted may be determined at will. A captured image generated by the imaging sensor 11 included in the imaging device 10 may be outputted to a display device 27, which is installed in the vehicle 26, via a dedicated line, an onboard network, or the like. The display device 27 includes a liquid crystal display, an organic EL display, or the like, and the display device 27 is disposed, for example, in a position that allows the display device to be visible from a driver's seat of the vehicle 26. The display device 27 may display the captured image acquired from the imaging device 10.

Figure 11:
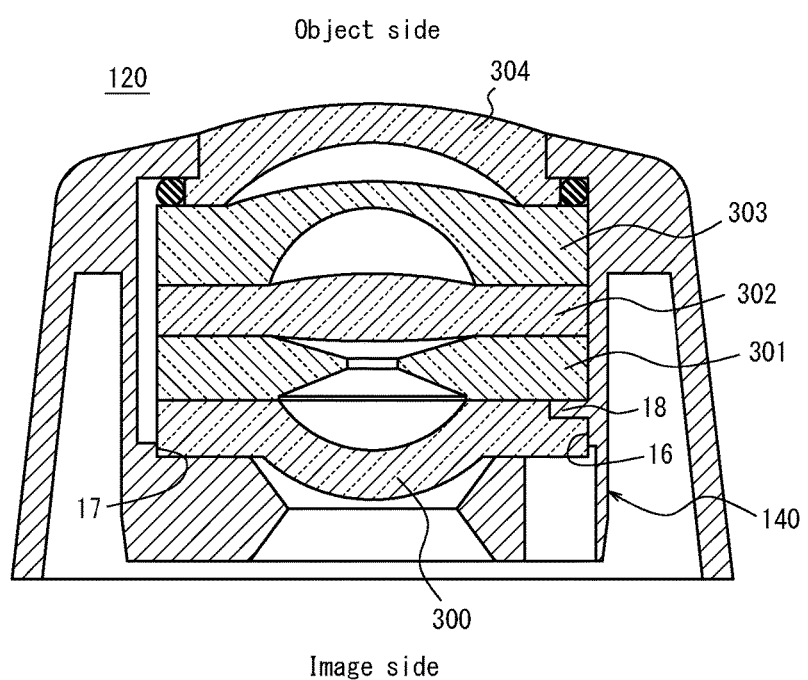
FIG. 11 is a sectional view passing through an optical axis of a lens unit, the figure illustrating a schematic configuration of a modification of a lens unit illustrated in FIG. 1.

Additionally, although the lens unit 12 described in the above embodiment has the single lens 13, the lens unit may also include a plurality of lenses. For instance, as illustrated in FIG. 11, a lens unit 120 according to a modification includes a plurality of lenses 300 to 304 and a lens barrel 140. The shapes of the plurality of lenses 300 to 304 may be determined at will. The plurality of lenses 300 to 304 are held in the lens barrel 140 in a manner such that optical axes of the lenses 300 to 304 align with each other. Similarly to the lens barrel 14 according to the above embodiment, the lens barrel 140 includes the first inclined portion 16, the second inclined portion 17, and the protruding portion 18. Accordingly, similarly to the above lens barrel 14, the lens barrel 140 prevents inclination of an optical axis of at least one of the plurality of lenses 300 to 304, such as the lens 300, from the first direction.

The invention claimed is:

1. A lens unit, comprising:
a lens barrel including a wall portion that is disposed on at least a part of a circumference on a plane perpendicular to a first direction and that extends in the first direction, the wall portion including at least two first inclined portions and at least two second inclined portions, the first inclined portions are formed around a first circumference about a central axis, the second inclined portions are formed around a second circumference about the central axis that is positioned a spaced distance along the central axis from the first circumference, and the first inclined portions are alternately formed with the second inclined portions, a distance from each first inclined portion to the central axis, which passes through a center of the circumference and which is parallel with the first direction, being decreased as the first inclined portion extends to the first direction, and a distance from each second inclined portion to the central axis being increased as the second inclined portion extends to the first direction; and
a lens held in the wall portion by the first inclined portions and the second inclined portions.

2. The lens unit of claim 1, wherein
a position in the first direction of the first inclined portion in which the distance to the central axis is smallest differs from a position in the first direction of the second inclined portion in which the distance to the central axis is smallest.

3. The lens unit of claim 1, wherein
the first inclined portions and the second inclined portions are disposed at an equal interval along a circumferential direction about the central axis.

4. The lens unit of claim 1, wherein
in the wall portion, at least two first holding units, at least two second holding units, or at least one of the first holding units and at least one of the second holding units are disposed at an equal interval along a circumferential direction about the central axis, each first holding unit including at least two of the first inclined portions and at least one of the second inclined portions in vicinity of each other in the circumferential direction, and each second holding unit including at least one of the first inclined portions and at least two of the second inclined portions in vicinity of each other in the circumferential direction.

5. The lens unit of claim 1, wherein
the wall portion includes, in different positions in a circumferential direction about the central axis, at least three of the first inclined portions and at least three of the second inclined portions.

6. The lens unit of claim 1, wherein
the wall portion further includes, on a side of the first inclined portion that is further in the first direction, a protruding portion protruding toward the central axis.

7. The lens unit of claim 1, wherein
sections that overlap with the first inclined portions and that extend to the first inclined portions as viewed in a direction opposite to the first direction and sections that overlap with the second inclined portions and that extend to the second inclined portions as viewed in the first direction are hollow.

8. An onboard camera, comprising:
a lens barrel including a wall portion that is disposed on at least a part of a circumference on a plane perpendicular to a first direction and that extends in the first direction, the wall portion including at least two first inclined portions and at least two second inclined portions, the first inclined portions are formed around a first circumference about a central axis, the second inclined portions are formed around a second circumference about the central axis that is positioned a spaced distance along the central axis from the first circumference, and the first inclined portions are alternately formed with the second inclined portions, a distance from each first inclined portion to the central axis, which passes through a center of the circumference and which is parallel with the first direction, being decreased as the first inclined portion extends to the first direction, and a distance from each second inclined portion to the central axis being increased as the second inclined portion extends to the first direction;
a lens held in the wall portion by the first inclined portions and the second inclined portions; and
an imaging sensor that captures an image of a subject that is formed by the lens.

9. An imaging device, comprising:
a lens barrel including a wall portion that is disposed on at least a part of a circumference on a plane perpendicular to a first direction and that extends in the first direction, the wall portion including at least two first inclined portions and at least two second inclined portions, the first inclined portions are formed around a first circumference about a central axis, the second inclined portions are formed around a second circumference about the central axis that is positioned a spaced distance along the central axis from the first circumference, and the first inclined portions are alternately formed with the second inclined portions, a distance from each first inclined portion to a central axis, which passes through a center of the circumference and which is parallel with the first direction, being decreased as the first inclined portion extends to the first direction, and a distance from each second inclined portion to the central axis being increased as the second inclined portion extends to the first direction;
a lens held in the wall portion by the first inclined portions and the second inclined portions; and
an imaging sensor that captures an image of a subject that is formed by the lens.

* * * * *